United States Patent
Meiler et al.

[11] Patent Number: 6,038,761
[45] Date of Patent: Mar. 21, 2000

[54] METHOD FOR MANUFACTURING A ROTOR UNIT FOR A SYNCHRO SYSTEM

[75] Inventors: Reinhold Meiler, Feldkirchen; Dirk Stevens, Groebenzell, both of Germany

[73] Assignee: Siemens Aktiengesellschaft, Munich, Germany

[21] Appl. No.: 08/859,601

[22] Filed: May 20, 1997

[30] Foreign Application Priority Data

May 20, 1996 [DE] Germany .......................... 196 20 183

[51] Int. Cl.⁷ .................................................. H01F 7/06
[52] U.S. Cl. .............................................. 29/605; 29/598
[58] Field of Search ................... 29/605, 598; 336/120; 310/261, 264

[56] References Cited

U.S. PATENT DOCUMENTS

| | | | |
|---|---|---|---|
| 1,102,369 | 7/1914 | Varley | 310/264 |
| 4,327,347 | 4/1982 | Remus | 336/120 |
| 5,113,105 | 5/1992 | Ikegami et al. | 310/261 |
| 5,140,211 | 8/1992 | Ucida | 310/261 |
| 5,144,182 | 9/1992 | Lemmer et al. | 310/261 |

FOREIGN PATENT DOCUMENTS 0 511 082  4/1992  European Pat. Off. .

*Primary Examiner*—S. Thomas Hughes
*Assistant Examiner*—Jermie E. Cozart
*Attorney, Agent, or Firm*—Hill & Simpson

[57] ABSTRACT

A ring transformer having a core, at least one winding and at least two flanges, and a rotor plate packet having at least one winding is arranged on a rotor shaft before the winding process. A coil body having at least two wind-on connectors is arranged on the transformer core. The wind-on connectors are offset relative to one another and a section of wind-on connectors radially projects outside the circumferential contour of the ring transformer. The winding wire ends of the transformer winding are secured to the wind-on connectors during the winding of the synchro system. The section of the wind-on connectors projecting outside the circumference of the ring transformer is subsequently removed. In this way, the iron parts of the rotor winding and of the ring transformer can be mounted in advance on the rotor shaft and all windings can be continuously wound in one work process.

5 Claims, 2 Drawing Sheets

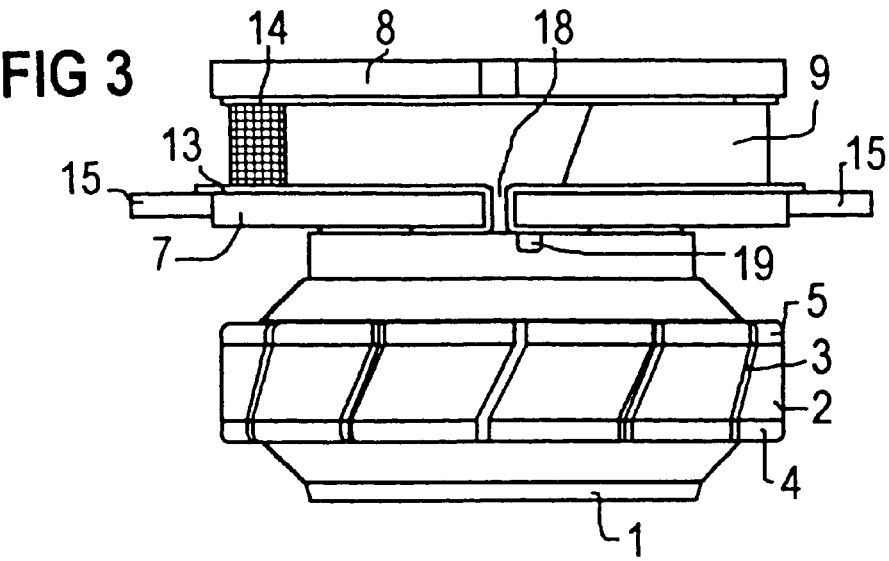
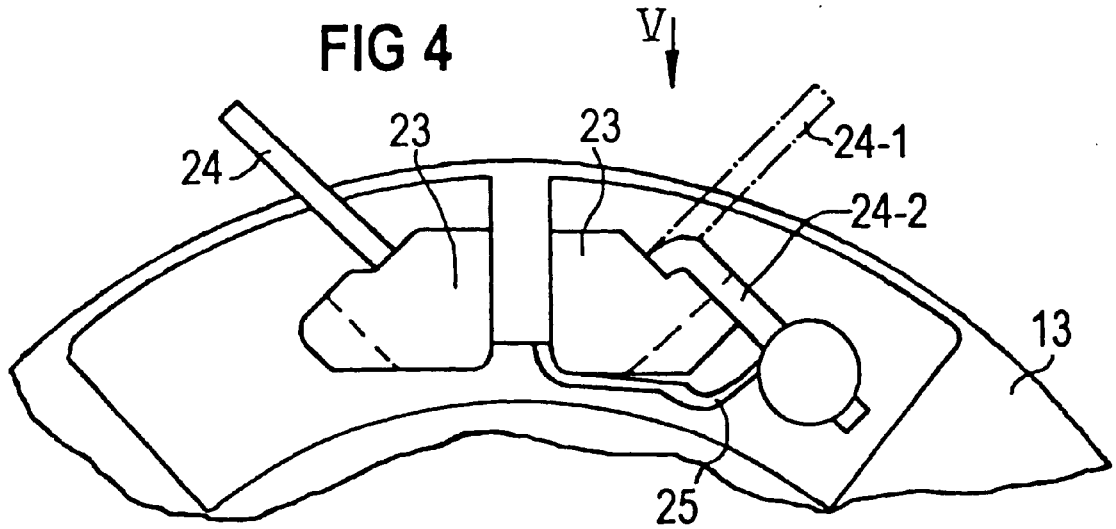
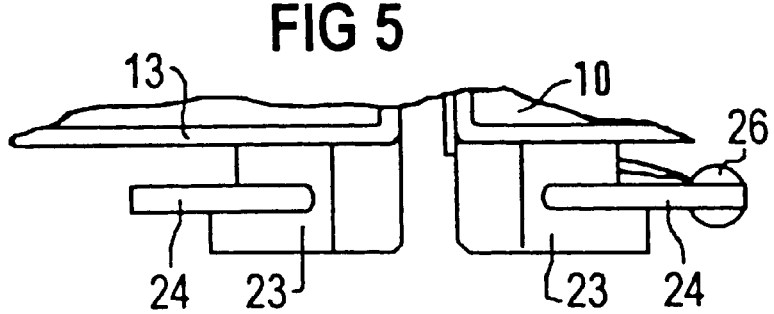

METHOD FOR MANUFACTURING A ROTOR UNIT FOR A SYNCHRO SYSTEM

BACKGROUND OF THE INVENTION

The invention is directed to a rotor unit and method for manufacturing a rotor unit for a synchro system with a ring transformer, insulating coil body and rotor plate packet that are capable of being wound in one continuous process. The invention is also directed to a coil body used in this method.

A synchro system is an electric system for transmitting angular position or motion. It generally consists of a synchro transmitter connected by wires to a synchro receiver. More complex synchro systems include transformers, differential transmitters and receivers.

It is standard in synchro systems that are free of wiper rings, such as in European Patent Document EP 0 511 082 A1, the respective windings for the ring transformer and the actual synchro system rotor are wound separated into individual units and are assembled in a later assembly process to form the complete rotor unit. The start and end of each winding must first be conducted out and secured before further-processing. The winding ends must then be undone in turn at the assembled rotor unit, correctly allocated to one another and connected to one another.

SUMMARY OF THE INVENTION

A goal of the present invention is to specify a method with which all windings of the rotor unit can be wound in one continuous work process in order to achieve a simpler and faster manufacturing process.

This goal is inventively achieved with a rotor unit and a method for manufacturing the rotor unit in which a transformer core and a rotor plate packet are assembled on the common rotor shaft before the winding process. A coil body having at least two wind-on connectors is arranged on the transformer core. The wind-on connectors are offset relative to one another and radially project outside the circumferential contour of the ring transformer. The winding ends of the transformer winding are secured to the wind-on connectors during the winding of the synchro system. The section of the wind-on connectors projecting outside the circumference of the ring transformer is subsequently removed.

By the inventive method, both the transformer winding and the rotor winding(s) are continuously wound onto the previously pre-assembled iron cores of the rotor unit. This, however, is possible only by employing radially projecting wind-on connectors. This previously seemed impossible since such wind-on connectors have too little space in the stator bore of the synchro system, thus, the rotor with these wind-on connectors could not be inserted. Inventively, these wind-on connectors only serve as temporary interim fastening for the winding ends of transformer winding and rotor winding. Upon completion of the winding process, the wind-on connectors are removed insofar as they project beyond the admissible circumference of the rotor unit. This can occur either before the ultimate connection of the various winding wire ends of the transformer winding to the winding wire ends of the rotor windings or after this connection has been carried out.

In an embodiment, the wind-on connectors can be anchored as wire pins in a shoulder laterally applied to an outer flange of the coil body, for example by being pressed in. It is advantageous in this case when, after the winding processes, the respective projecting section of the wire pin is bent back into the region within the circumferential contour of the rotor unit.

In another preferred embodiment, the wind-on connectors, however, are mounted to the circumference of a coil body flange in the form of insulator pegs and they are cut off after the winding processes. Given this procedure, one obtains the additional advantage that no additional mass elements remain at the rotor that could disturb the rotational symmetry under certain circumstances.

A coil body utilized in this inventive method is preferably designed such that it has a U-shaped cross section as an insulator ring with two all-around flanges. Further, at least two wind-on connectors in the form of pegs or wire pins are mounted on one of the flanges and project radially outward. The wind-on connectors are offset at an angle relative to one another. In order to be able to mount a transformer core which has a U-shaped cross section around this coil body, the coil body is composed of two semicircular ring segments. The wind-on connectors are preferably mounted on one of the ring segments.

The invention is explained in greater detail below with reference to exemplary embodiments on the basis of the drawing.

BRIEF DESCRIPTION OF THE DRAWINGS

FIG. 3 is a plan view of the rotor unit in FIG. 1.

FIG. 4 is an excerpted side view of a coil body segment with modified wind-on connectors in comparison to FIG. 2.

FIG. 5 is a plan view onto the coil body segment of FIG. 4.

DETAILED DESCRIPTION OF THE PREFERRED EMBODIMENTS

Figure 1:
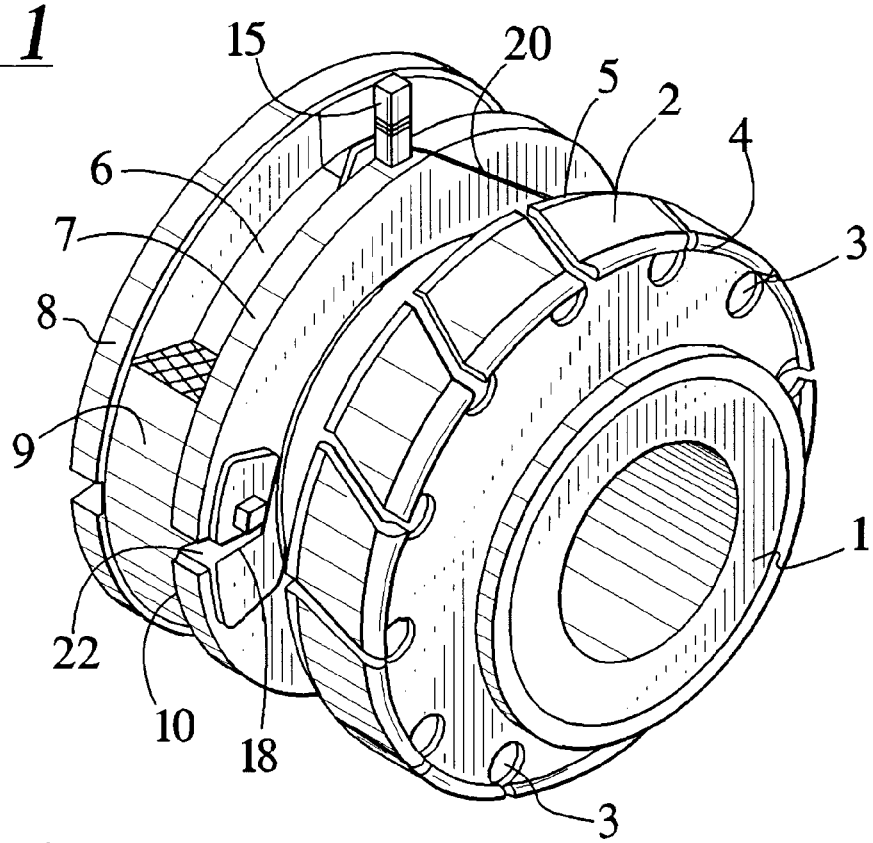
FIG. 1 is a perspective view of a rotor unit for a synchro system.

A rotor unit shown in FIGS. 1 and 3 has a rotor shaft 1 on which a rotor plate packet 2 having a predetermined number of obliquely guided channels 3 is arranged. This plate packet 2 is limited by insulating flanges 4 and 5 at both end faces. An annular transformer core 6 having a U-shaped cross section is also arranged on a rotor shaft 1 axially offset relative to the plate packet 2. The transformer core 6 accepts a transformer winding 9 between its two iron flanges 7 and 8.

Figure 2:
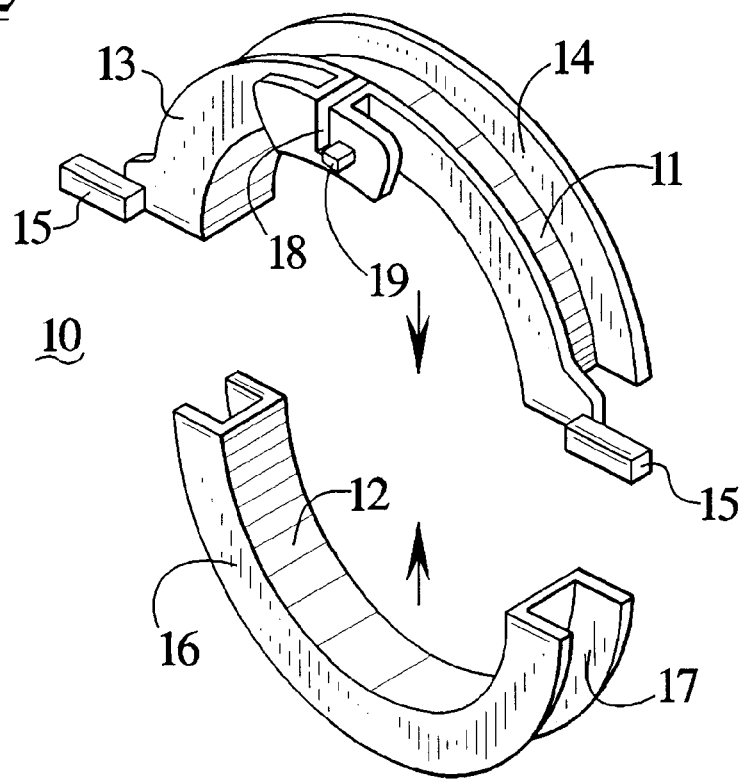
FIG. 2 is a perspective view of a coil body composed of two ring segments for the transformer part of the rotor unit of FIG. 1.

A bipartite coil body 10 shown as an individual part in FIG. 2 insulates the transformer winding 9 from the transformer core 6. Accordingly, the coil body 10 is composed of two ring segments 11 and 12 each having a U-shaped cross section. At least two wind-on connectors 15 (shown here as pegs) are mounted to the first ring segment 11 (the ring segment at the top of FIG. 2 with two flanges 13 and 14). The pegs 15 act as wind-on connectors and lie opposite to one another or are offset relative to one another by approximately 180°. A radial slot 18 is constructed at the ring segment 11 in the flange 13. A wire 20 is introduced through this radial slot 18 to the lower plies at the base of the U-shaped coil body 10 at the beginning of winding. In order to facilitate the introduction of the wire, a hook 19 (or other similar clasp or latching device) for threading the wire projects from the flange 13 next to the radial slot 18. The second ring segment 12 with flanges 16 and 17 is simpler to manufacture because it has fewer parts.

In the manufacture of the rotor unit, the plate packet 2 with the insulating flanges 4 and 5 as well as the transformer core 6 are first secured on the rotor shaft 1. The coil body 10 in the form of the ring segments 11 and 12 is then introduced into the transformer core 6. At this point, the assembled rotor unit is then introduced into a winding mechanism wherein the transformer winding 9 is wound first. To this end, the start of a winding wire 20 is first wound to one of the pegs 15 and, proceeding from there, has its section 20 wrapped first next to the flange 7 with approximately half a revolution of the rotor unit around the rotor shaft 1 until it is caught at the hook 19. The wire 20 proceeds through the slot 18 of the coil body flange 13 as well as within a slot 22 of the iron flange 7 into the winding space where the transformer winding 9 is located. After the end of this winding process, the winding end is again directed out through a slot 22 or 18 and is wound around the second peg 15. From this point on, the wire 20 can then be directed to the plate packet 2 where the synchro system rotor windings are produced in the channel 3. However, a different wire can also be used to wind these rotor windings. When all windings have been completely wound on the rotor unit, the winding wire end of the transformer winding 9 is connected to the winding wire end of the rotor winding or windings in the plate packet 2, i.e., is soldered. A section of the wind-on connectors 15 extending beyond the circumference of the coil body flange 13 is cut off before or after this connecting process, so that no parts are projecting beyond the circumferential edge.

The inventive method has the advantage that rotor packets having smaller dimensions can also be wound, since minimum spacings between the rotor and the transformer part are required for the guidance of the winding wire.

FIGS. 4 and 5 show another embodiment. In this case, the coil body flange 13 has lateral projections 23 into which wind-on connectors in the form of pins 24 are pressed at an angle relative to one another. The winding wire 25 is soldered (solder point 26) to these pins 24. The pins 24 are bent over inwardly at the finished part so that they no longer project beyond the circumference of the coil body 10. In FIG. 4, these two phases of the manufacture are shown in that the two positions of the pins are referenced 24-1 during winding and 24-2 after winding.

Although the present invention has been described with reference to a specific embodiment, those of skill in the art will recognize that changes may be made thereto without departing from the scope and spirit of the invention as set forth in the appended claims.

What is claimed is:

1. A method for manufacturing a rotor unit for a synchro system having a ring transformer, the method comprises:

assembling the ring transformer and a rotor plate packet on a rotor shaft, the ring transformer having a core and at least two flanges, and the rotor plate packet having channels for accepting a winding;

placing an insulating coil body on the core, the insulating coil body having at least two wind-on connectors offset relative to one another and projecting radially beyond a circumferential contour of the ring transformer;

securing a winding wire to one of the at least two wind-on connectors;

wrapping the winding wire around the rotor shaft next to one of the at least two flanges of the ring transformer for at least one-half a revolution;

directing the winding wire through an opening in the insulating coil body to the ring transformer;

winding the winding wire about the insulating coil body of the ring transformer;

winding the winding wire in the channels of the rotor plate packet continuously with said step of winding the winding wire about the insulating coil body;

fastening an end of the winding wire at the ring transformer to one of the at least two wind-on connectors; and subsequently removing a section of the at least two wind-on connectors from a position projecting radially beyond the circumferential contour of the ring transformer.

2. The method according to claim 1, wherein the step of assembling the ring transformer and rotor plate packet further comprises:

axially offsetting the core from the rotor plate packet.

3. The method according to claim 1, further comprises the step of:

connecting the end of the winding wire at the ring transformer with the end of the winding wire at the rotor plate packet.

4. The method according to claim 1, wherein the step of subsequently removing a section of the at least two wind-on connectors from a position projecting radially beyond a circumferential contour of the ring transformer further comprises:

bending the section of the at least two wind-on connectors within the circumferential contour of the transformer.

5. The method according to claim 1, wherein the step of subsequently removing a section of the at least two wind-on connectors from a position projecting radially beyond a circumferential contour of the ring transformer further comprises:

cutting off the section of the at least two wind-on connectors.

* * * * *